(12) United States Patent
Larsen et al.

(10) Patent No.: US 6,324,919 B1
(45) Date of Patent: Dec. 4, 2001

(54) MULTI-AXIS WHEEL LOAD TRANSDUCER

(75) Inventors: Hugh W. Larsen; Carl E. Talaski, both of Milford, MI (US)

(73) Assignee: Michigan Scientific Corporation, Milford, MI (US)

( * ) Notice: Subject to any disclaimer, the term of this patent is extended or adjusted under 35 U.S.C. 154(b) by 0 days.

(21) Appl. No.: 09/244,312

(22) Filed: Feb. 4, 1999

Related U.S. Application Data (60) Provisional application No. 60/073,650, filed on Feb. 4, 1998.

(51) Int. Cl.$^7$ ................................................. G01D 7/00
(52) U.S. Cl. ................................................. 73/862.043
(58) Field of Search ........................ 73/862.043, 862.041, 73/862.04, 862.65, 862.06, 151, 168, 767, 781, 118, 862.34, 862.57, 862.637

(56) References Cited

U.S. PATENT DOCUMENTS

| | | |
|---|---|---|
| 3,867,838 | 2/1975 | Gerresheim . |
| 4,186,596 | 2/1980 | Bohringer et al. . |
| 4,297,877 | 11/1981 | Stahl . |
| 4,640,138 * | 2/1987 | Meyer et al. ..................... 73/862.04 |
| 4,748,844 | 6/1988 | Yoshikawa et al. . |
| 4,821,582 * | 4/1989 | Meyer et al. ..................... 73/862.04 |
| 5,231,374 | 7/1993 | Larsen et al. . |
| 5,604,317 | 2/1997 | Jachmann et al. . |
| 5,817,951 * | 10/1998 | Cook et al. ..................... 73/862.041 |

* cited by examiner

*Primary Examiner*—Benjamin R. Fuller
*Assistant Examiner*—Octavia Davis
(74) *Attorney, Agent, or Firm*—Young & Basile, P.C.

(57) ABSTRACT

The load transducer for measuring forces and/or moments on a rotatable member. In one embodiment, the transducer includes an inner ring member attachable to a wheel hub and an outer ring member attachable to a wheel rim. At least one and, preferably, a plurality of beams unitarily extend between the inner and outer ring members and are circumferentially spaced apart. Each beam is formed of a stem and a perpendicular crossleg. Wells are formed in the exterior surfaces of the stem and the crossleg for mounting a strain gage in a force or moment measurement orientation. Additional strain gages may be mounted on the exterior sidewalls of each stem. The strain gages are inter-connected in a bridge configuration for measuring forces and moments exerted on the wheel. Bores formed in the stem and the crossleg provide a passage for the conductors from each strain gage to an electrical connector mounted between the inner and outer ring members.

28 Claims, 11 Drawing Sheets

MULTI-AXIS WHEEL LOAD TRANSDUCER

CROSS-REFERENCE TO CO-PENDING APPLICATION

This application claims the benefit of the priority date of provisional Application Ser. No. 60/073,650 filed Feb. 4, 1998 in the name of Hugh W. Larsen and Carl E. Talaski and entitled "MULTI-AXIS WHEEL LOAD TRANSDUCER" the contents of which are incorporated herein by reference in their entirety.

BACKGROUND OF THE INVENTION

1. Field of the Invention

The present invention relates, in general, to apparatus for measurement of forces and/or moments acting on rotatable members, such as vehicle wheels.

2. Description of the Art

Figure 16:
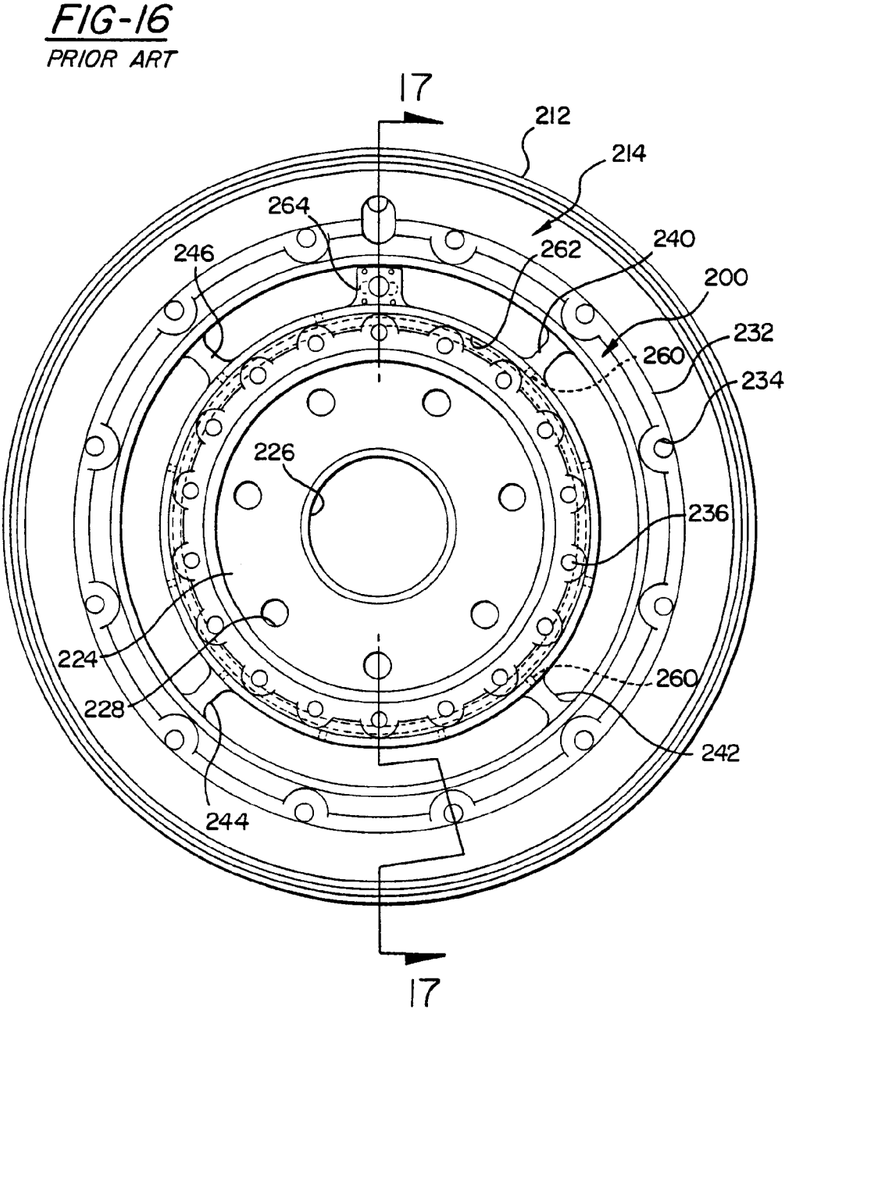
FIG. 16 is a front elevational view of a prior art wheel transducer mounted on a wheel rim.
Figure 17:
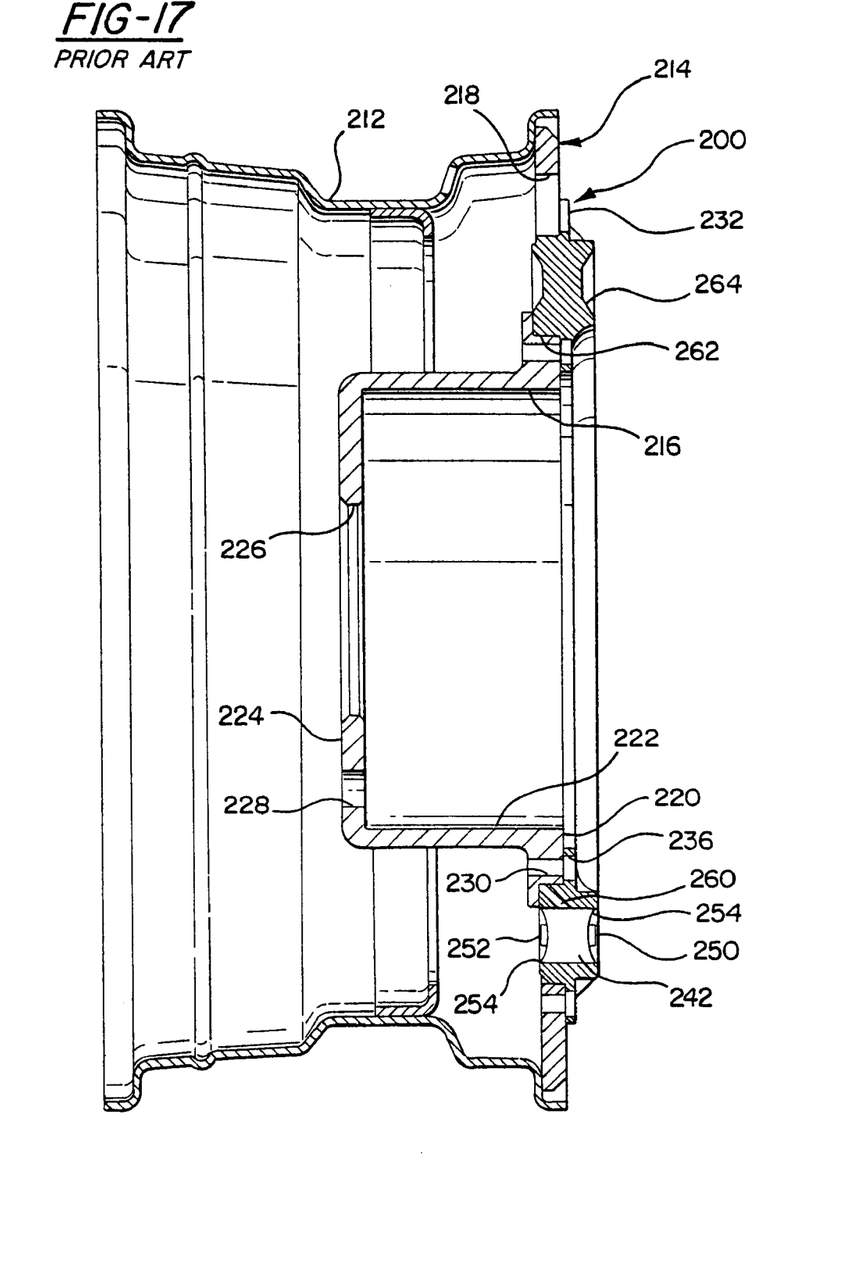
FIG. 17 is a cross sectional view generally taken along line 17—17 in FIG. 16.

Wheel load transducers are known for attachment to a vehicle wheel to measure torque, moments and forces applied to the wheel. Such transducers, as shown in FIGS. 16 and 17 and described in greater detail hereafter, are typically in the form of an annular member which is affixed at an outer peripheral portion to a rim adapter welded to the wheel rim. The adapter has a plurality of circumferentially spaced apertures which align with corresponding apertures in the outer periphery of the transducer for receiving bolts therethrough to fix to the transducer to the wheel rim.

The transducer also includes an inner annular portion which also has a plurality of circumferentially spaced apertures. A hub adapter containing a corresponding circumferential arrangement of apertures is mountable on the inner ring and fastened thereto. The hub adapter includes a standard hole arrangement for attachment to vehicle wheel bolt lugs.

A plurality of radial extending webs or beams interconnect the inner and outer portions of the transducer. Moments and forces exerted on the wheel are measured by sensors, such as strain gages, which are adhesively affixed to exterior surfaces of the webs or beams. Strain gages mounted on the inboard and outboard surfaces of the beams provide torque measurements. Strain gages mounted on the sides of the beams are positioned for providing steering and camber moments and lateral force measurements. This type of transducer is not capable of measuring vertical and fore and aft forces acting on the wheel.

Other more complex transducers are capable of measuring the three directional forces, torque, camber moment and steering moment. However, such wheel load transducers have required many output channels, such as up to twelve output channels to measure the three primary forces and three primary moments or torque exerted on a vehicle wheel. Further, all such transducers exhibit some degree of imperfection known as crosstalk. Crosstalk are measurement errors that occur when forces or moments are applied at directions at right angles to the desired measurement direction.

Thus, it would be desirable to provide a force and/or moment measurement device suitable for use with rotatable members, such as vehicle wheels, which is capable of obtaining force and/or moment measurements with a high degree of accuracy. It would also be desirable to provide such a measurement apparatus or transducer which minimizes crosstalk measurement errors between adjacent sensors. It would also be desirable to provide such a measurement apparatus or transducer which optimally locates the measurement devices or strain gages for more precise measurement. Finally, it would be desirable to provide such a measurement apparatus which has a minimal number of independent output data channels.

SUMMARY OF THE INVENTION

The present invention is the load transducer for measuring forces and/or moments on a rotatable member, such as a rotatable vehicle wheel.

In an exemplary embodiment, the load transducer of the present invention includes an inner ring member, means for attaching the inner ring member to a wheel hub, an outer ring member, means for attaching the outer ring member to a wheel rim, a beam connected between the inner and outer ring members, a well formed in the beam, and a sensor mounted in the well for measuring forces exerted on the beam.

Preferably, a plurality of beams, such as four by example, are formed between the inner and outer ring members circumferentially spaced ninety degrees apart. The beams are isolated from each other by apertures.

Preferably, each beam contains a stem extending from the inner ring member and a unitary crossleg which is connected to the outer ring member.

A well is formed on a first surface of the stem, preferably along the neutral or longitudinal axis of the stem. At least one and preferably a pair of wells formed around the crossleg equi-distantly spaced from the longitudinal axis of the stem. At least one sensor or strain gage is mounted in each well. Opposed, aligned wells are preferably formed on the opposite surface of the stem and the crossleg.

By example, each strain gage is in the form of a plurality of linearly arranged resistor strips. Preferably, each strain gage is formed of a pair of angularly disposed resistor strips. The strain gage sensitivity in each beam is equalized. Preferably, the sensitivity of each strain gage in each crossleg is one half of the sensitivity of the strain gage in each stem.

An electrical connector is mounted between the inner and outer ring members. Bores are formed in the stem and the crossleg of each beam from each well in the beam to provide passage for electrical conductors from each strain gage to the electrical connector. Preferably, a recess is formed along the outer ring member for carrying the wires from each beam to the connectors.

The load transducer of the present invention provides significant advantages over previously devised load transducers used for measuring forces and/or moments on rotatable members, such as vehicle wheels. The unique provision of mounting the strain gages in wells on each beam significantly reduces crosstalk between the adjacent strain gages which previously has led to inaccurate force and/or moment measurement. Equalizing the sensitivity of the strain gages mounted in the wells on each beam in the radial and tangential directions significantly enhances the force and moment measurement accuracy.

The individual sensors or strain gages in each beam may easily be connected in four arm bridge configurations on the transducer so as to provide a minimal number of separate data output channels from the transducer. This minimizes interconnection between the transducer and an external data acquisition unit.

BRIEF DESCRIPTION OF THE DRAWINGS

The various features, advantages, and other uses of the present invention will become more apparent by referring to the following detailed description and drawing in which.

DESCRIPTION OF THE PREFERRED EMBODIMENT

Before describing the features of the present invention, a description of a prior art load transducer mounted on a motor vehicle wheel will be described for background purposes and to more clearly understand the novel features of the present invention.

As shown in FIGS. 16 and 17, a load transducer 200 is mounted on a wheel rim 212 by means of a rim adapter 214 and on a wheel hub by a hub adapter 216.

The rim adapter 214 is in the form of an annular ring having an outer peripheral edge which is securely fixed, such as by welding to the inner surface of the outer peripheral edge of the rim 212 as shown in FIG. 17. A plurality of circumferentially spaced, internally threaded bores 218 are formed in the rim adapter 214 generally spaced in close proximity to an inner annular edge in the rim adapter 214.

The hub adapter 216 is formed as a one piece member having an outer peripheral flange 220, an annular side wall 222 and an inner wall 224. A large centrally located aperture 226 is formed in the inner wall 224 to provide access to a vehicle wheel hub, not shown. Further, a plurality of circumferentially spaced, smaller apertures 228 are spaced about the periphery of the inner wall 224 between the central aperture 226 and the annular side wall 222. The apertures 228 are provided in a number and in a circumferential spacing which matches the particular bolt pattern of the vehicle wheel. The apertures 228 are mountable over the vehicle wheel lug bolts secured thereto by means of nuts, not shown, to securely attach the hub adapter 216 to the vehicle wheel hub. A plurality of bores 230 are formed in the peripheral edge or flange 220 of the hub adapter 216.

The load transducer 200 is interposed between and fixedly connected to both of the rim adapter 214 and the hub adapter 216 as shown in FIGS. 16 and 17.

The load transducer 200 is in the form of a unitary, one piece body or member having an annular flange 232 with a plurality of radially outer apertures 234 which are alignable with the bores 218 in the rim adapter 214. The apertures 234 receive a threaded bolt, not shown, which threadingly engages this aperture 218 in the rim adapter 214 to fixedly mount the transducer 200 to the rim adapter 214.

A plurality of radially inner apertures 236 are also formed in the annular ring 232 off the transducer 200 and are alignable with the threaded bores 230 in the hub adapter 216. The apertures 236 likewise receive a threaded bolt, not shown, which threadingly engages the threaded bore 230 in the hub adapter 216 to fixedly mounts the transducer 200 to the hub adapter 216. In this manner, the transducer 200 is fixedly connected in a load and force path between the rim adapter 214 and vehicle wheel rim 212 and between the hub adapter 216 and the vehicle wheel hub, not shown.

A plurality of webs, such as four webs 240, 242, 244 and 246 by way of example only, are unitarily formed between the radially outer portion of the flange 232 and the radially inner portion of the flange or 232. The webs 240, 242, 244 and 246 are circumferentially spaced apart, preferably at a ninety degree (90°) spacing by apertures. The thin cross section of each web 240, 242, 244 and 246 is subjected to lateral forces as well as camber and steering moments and driving torque during operation of the vehicle wheel. This force and moments can be measured by mounting sensors, such as strain gages 250 and 252 shown in FIG. 17, on the inner and outer surfaces of each web 240, 242, 244 and 246. The sensors 250 and 252 typically comprise conventional strain gages having a plurality of linear arranged resistor strips disposed in a herringbone pattern at a ninety degree spacing in opposed pairs. As shown in FIG. 17, the inner and outer surfaces of each web, such as web 242, has a shallow recess 254 formed therein. The recess 254 has a small depth so as to enable each strain gage 250 and 252 to be mounted therein flush with the inner or outer surface of the web to protect the strain gage 250 or 252 from damage.

As shown FIG. 17, a plurality of small diameter wire bores 260 are formed adjacent to each web 240, 242, 244, and 246 as well as circumferentially about the inner portion of the flange 232. The bores 260 communicate with the apertures between the webs, 240, 242, 244 and 246 and an annular bore 262 formed in the inner portion flange 232. The bores 260 and 262 enable wires from the strain gages mounted on each web 240, 242, 244 and 246 to be routed to an electrical connector 264, such as a multi-pin electrical connector 264, fixedly mounted between the inner and outer portions of the flange 232. The connector 264, provides an output connection to a remote data acquisition unit, not shown.

In use, the strain gages 250 and 252 are mounted at various locations on the webs 240, 242, 244, and 246 to measure lateral force, driving torque as well as camber moment and steering moment. For example, sensors mounted on the sidewalls of the webs 242 and 246 may be interconnected into a conventional four arm bridge to provide an output corresponding to steering moment. Similarly, the output of sensors or strain gages 250 and 252 mounted on the sidewalls of the webs 240 and 244 can be interconnected into a four arm conventional bridge to provide an output corresponding to camber movement. Likewise, sensors or strain gages 250 and 252 mounted on the side walls of all four webs 240, 242, 244 and 246 may be interconnected in a bridge to provide an output corresponding to lateral force exerted on the transducer 200. Finally, strain gages 250 and 252 mounted on the recesses 254 on each web 240, 242, 244 and 246 are interconnected in a conventional bridge to provide an output corresponding to driving torque exerted on the transducer 200.

While the transducer 200 is capable of providing measurement of lateral force, torque, camber moment and steering moment exerted on a vehicle wheel, vertical forces and fore and aft forces were not able to be measured.

Referring now to the drawing, and to FIGS. 1–6, in particular, there is depicted a multi-axis wheel load transducer 10; which is mountable on a wheel rim 12; and which receives a hub adapter 14 for mounting the transducer 10 and the wheel rim 12 on a vehicle wheel hub, not shown.

The multi-axis wheel load transducer 10 is preferably formed of a one-piece member which is machined or forged to the desired shape. It will be understood that the transducer 10 may also be constructed by other methods, such as by fixably interconnecting multiple components into a one piece member.

Figure 6:
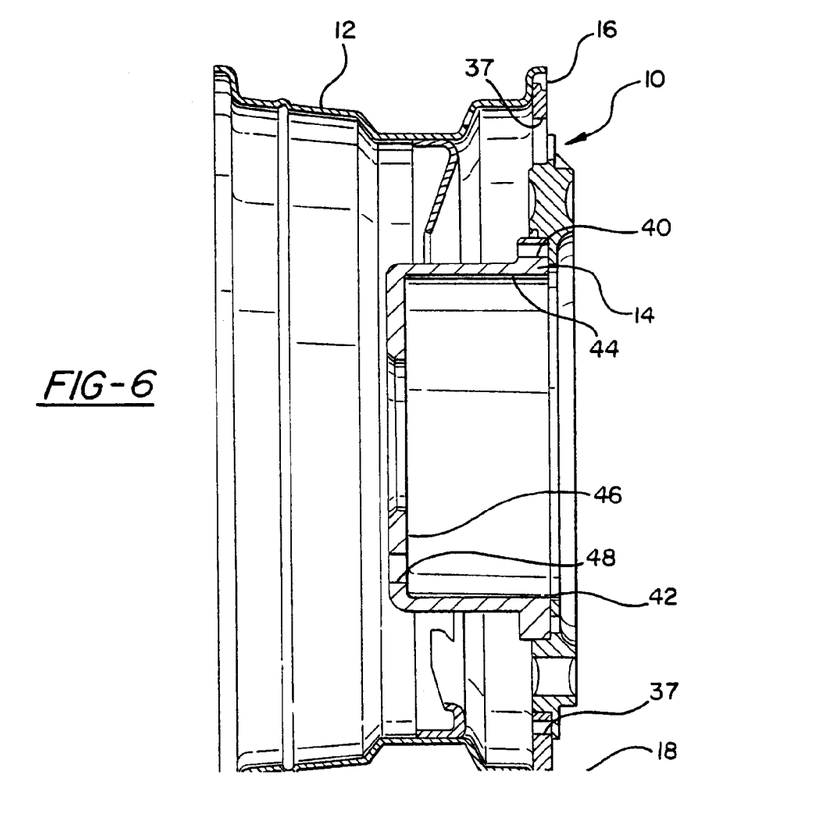
FIG. 6 is a cross sectional view showing the mounting of the wheel load transducer of FIG. 1 on a wheel rim and receiving a hub adapter.

A rim adapter 16 is fixed, such as by welding to the vehicle rim 12 as shown in FIG. 6, and is formed as an annular member or ring with a plurality of circumferentially spaced apertures 37. The transducer 10 includes having an outer annular member or ring 18. The transducer 10 includes an annular peripheral edge 20. The outer surface of the outer ring 18, in the orientation shown in FIGS. 1–3, tapers upwardly along an arcuate surface 22 to a top surface 24.

Figure 1:
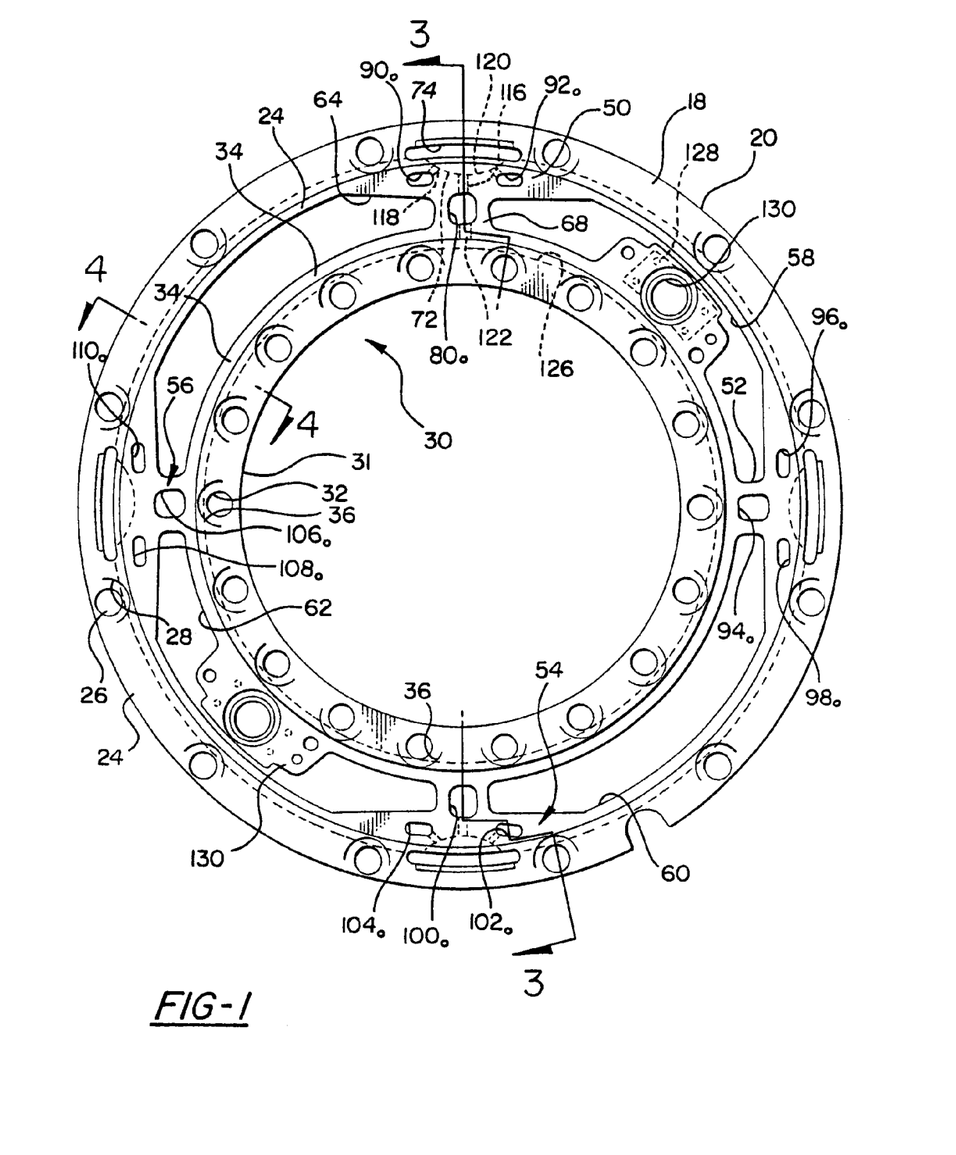
FIG. 1 is a front elevational view of a wheel load transducer constructed in accordance with the teachings of the present invention.

A plurality of apertures 26 are formed in the outer ring 18 adjacent to the peripheral edge 20 and circumferentially spaced about the outer ring 18. The apertures 26 are disposed in concave walls 28 formed in the arcuate surface 22 of the outer ring 18 and aligned with apertures 37 in the rim adapter 16 to receive threaded bolts to fix the transducer 10 to the rim adapter 16.

The transducer 10 also includes an inner annular ring 30 having a diameter smaller than the diameter of the outer ring 18. The inner ring 30 is concentrically disposed within the outer ring 18 and also has a plurality of apertures 32 circumferentially spaced thereabout in concave walls 36. The inner ring 30 extends from an inner peripheral edge 31 through an arcuate surface 33 to a top surface 34 which is generally co-planar with the top surface 24 of the outer ring 18.

The bores 32 in the inner ring 30 are alignable with a plurality of apertures or bores 40 in the hub adapter 14 seen in FIG. 6. The hub adapter 14 has an outer peripheral flange 42, an annular recessed side-wall 44 and an inner bottom wall 46. A plurality of apertures 48 are circumferentially spaced about the bottom wall 46 in a pattern corresponding to a vehicle wheel hub lug or bolt pattern to fixably mount the hub adapter 14 to the wheel hub by means of nuts mountable over the threaded lugs extending outward from the wheel hub. In this manner, the entire transducer 10 can be fixably attached to a wheel rim 12 and then fixably mounted along with the rim 12 on a wheel hub.

A plurality of beams or webs 50, 52, 54 and 56, integrally and radially extend between the inner ring 30 and the outer ring 18. The beams 50, 52, 54 and 56 are circumferentially spaced and separated by elongated slots 58, 60, 62 and 64 which isolate the beams 50, 52, 54 and 56 from each other.

Four beams 50, 52, 54 and 56 are illustrated in FIG. 1 in a preferred embodiment to enable vertical, longitudinal and lateral forces, as well as torque, camber and steering moments to be accurately measured without crosstalk. Preferably, the four beams 50, 52, 54 and 56 are spaced ninety degrees apart between the inner ring 30 and the outer ring 18.

As the beams 50, 52, 54 and 56 are identically constructed, the following description will be understood to apply equally to each of the beams 50, 52, 54 and 56.

Figures 2, 3:
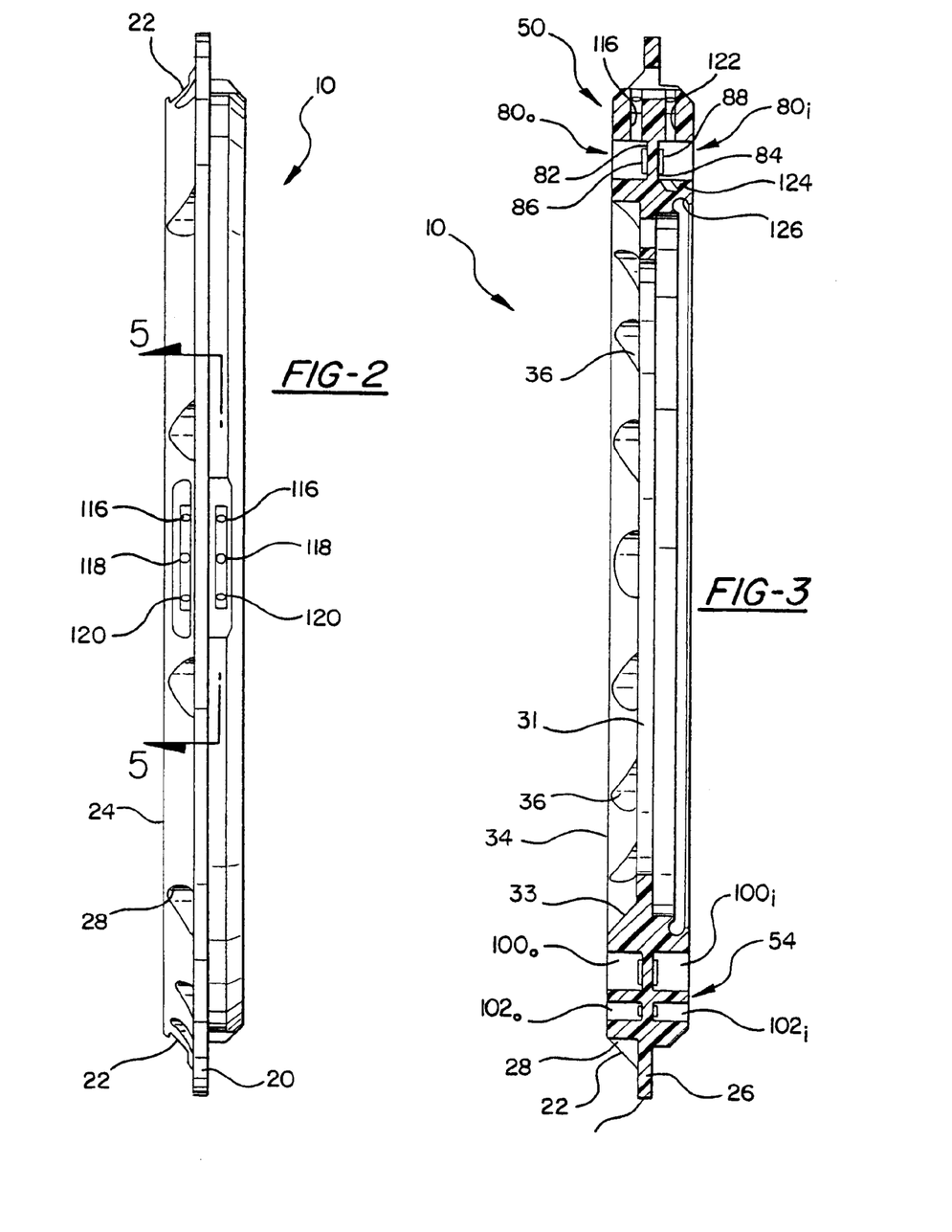
FIG. 2 is a right side elevational view of the wheel load transducer shown in page 1.
FIG. 3 is a cross sectional view generally taken along line 3—3 in FIG. 1.
Figures 4, 5:
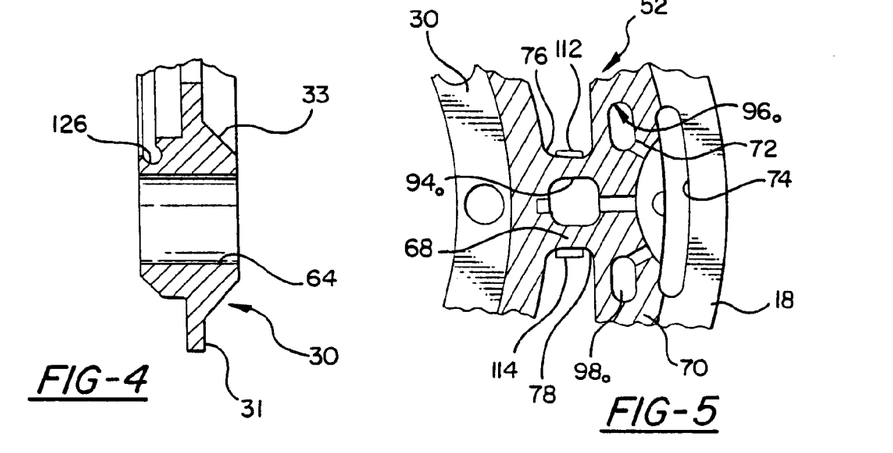
FIG. 4 is a cross sectional view generally taken along line 4—4 in FIG. 1.
FIG. 5 is a cross sectional view generally taken along line 5—5 in FIG. 2.

Each beam, such as beam 50 in FIGS. 1 and 3 and beam 52 in FIG. 5, is formed with a stem 68 projecting from the inner ring 30. The stem 68 is integrally formed and centrally located on a crossleg 70 having outer ends which extend outwardly from the centrally located stem 68. The outer ends of the crossleg 70 are integrally joined to an inner peripheral edge of the outer ring 18. However, in order to isolate the beam 50 from the outer ring 18, a cutout or notch 72 in the form of a semi-circle, by example only, is formed along an outer edge of the crossleg 70, generally centrally located over the stem 68. An opposed notch or cutout 74 is formed on the inner surface of the outer ring 18 in registry with the notch 72 to separate a portion of the crossleg 70 from the outer ring 18.

The stem 68 of the beam 50 is formed with opposed side walls 76 and 78 which are oriented substantially perpendicular to the top surfaces 24 and 34 of the outer ring 18 and the inner ring 30, respectively.

A plurality of wells are formed in each beam 50, 52, 54 and 56 at selected locations in each beam for mounting sensors, such as strain gages, for measuring selected directional forces and moments. According to preferred embodiment, a well 80$i$ is formed in the stem 68 of the beam 50. As shown in FIG. 3, the well 80$i$ has a generally rectangular shape with radius corners, although other shapes may also be employed, such as oval, circular, oblong, etc. The well 80$i$ extends inward through the stem 68 from the back or inner surface of the stem 68 continuous with the top surface 34 of the inner ring 30 to a bottom wall 84 which is parallel to and disposed in close proximity to the neutral axis of the stem 68. An opposed well 80$o$ projects from a front or outer surface of the stem 68 to a bottom wall 82 also disposed in close proximity to the neutral axis and parallel to the bottom wall 84 of the opposed well 80i.

The small letter designations "i" and "o" identifying each well refer to the location of the well on the inner surface or outer surface, respectively, of each beam 50, 52, 54 and 56. The terms "inner" and "outer" surface designations refer to the orientation of the major surfaces of the beams with reference to the normal mounting position of the transducer 10 on a wheel.

One or more strain gages 86 are fixedly mounted on the bottom wall 82 of the well 80$o$ by means of a high strength adhesive, such as an epoxy. One of more strain gages denoted generally by reference number 88 are similarly mounted on the bottom wall 84 of the opposed well 80$i$.

For clarity in the following description, the one or more strain gages 86 or 88 mounted in a particular well will be depicted and referred to by the respective well reference number. Thus, even though the strain gages 86 and 88 are described above as being respectively mounted in the wells 80$o$ and 80$i$, hereafter such strain gages will be referred to by the respective well reference numbers 80$o$ and 80$i$.

As shown in FIG. 1, each beam, such as beam 50, also includes two additional pairs of wells 90 and 92 in the crossleg 70. The wells 90 and 92 are slightly smaller than the well 80 in the stem 68 and extend generally perpendicular to the longitudinal or neutral axis of the stem 68. Opposed wells 90$o$, 90$i$, 92$o$ and 92$i$ extend from opposite inner and outer surfaces of the crossleg 70 to bottom walls disposed in close proximity with and parallel to the neutral axis of the crossleg 70.

For purposes of this invention, the neutral axis of each stem 68 is defined as a center axis equidistantly spaced between the top or outer surface and the rear or inner surface of act beams 50, 52, 54 and 56 and also centered between the opposed side walls 76 and 78. The neutral axis of each crossleg 70 is defined as the center axis equidistantly spaced between the inner and outer surfaces of each beam 50, 52, 54 and 56 and, also, between the radial inner and outer surfaces of each crossleg 70. The neutral axes of each stem 68 and crossleg 70 of each beam 50, 52, 54 and 56 lie in the same place; but are oriented 90° from each other. This orientation of the wells in the crossleg 70 of each beam 50, 52, 54 and 56 places the strain gages mounted therein in a perpendicular plane from the plane of the strain gages in the stem 68 to enable measurement of vertical and fore and aft forces.

As each of the beams 50, 52, 54 and 56 are identically constructed, the beam 52 will have opposed stem wells 94i and 940 and opposed pairs of crossleg wells 96i, 96o, and 98i and 98o. Beam 54 will have opposed stem wells 100i and 100o, and opposed pairs of crossleg wells 102i, 102o, 104i, and 104o. Beam 56 will include opposed stem wells 106i and 106o and opposed pairs of crossleg wells 108i, 108o, 110i and 110o. The advantages afforded by the various wells in the beams 50, 52, 54 and 56 include a significant reduction in the amount of crosstalk or measurement errors that occur when forces or moments are applied at directions at right angles to the desired measurement direction of each strain gage mounted in each particular well. Locating the strain gages in close proximity to or substantially on the neutral axis of each beam 50, 52, 54 and 56 reduces the amount of crosstalk to approximately 20% of the amount of crosstalk when the strain gages are mounted on the exterior surface of a solid beam.

The wells in the beams 50, 52, 54 and 56, such as the wells 80i, 80o, 90i, 90o, 92i and 92o in the beam 50, are generally formed only large enough to receive the specific number of strain gages to be mounted therein. This enables the surrounding portions of the stem 68 or the crossleg 70 of beam 50 to be provided with a minimal amount of wall thickness to prevent breakage under the expected shear strains to be exerted on the beam 50.

Figure 9:
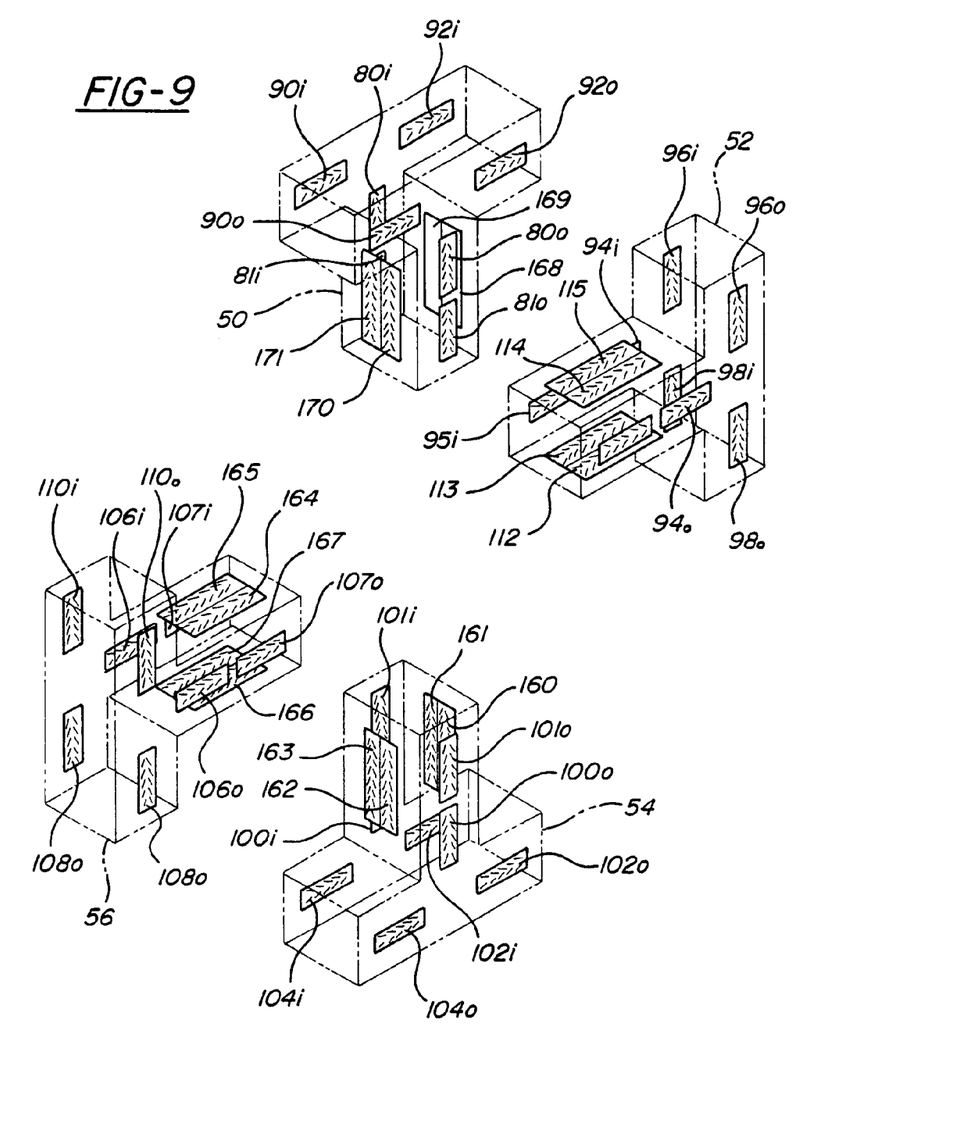
FIG. 9 is a pictorial representation of the transducer strain gage mounting locations on a vehicle wheel.

One or more strain gages are mounted in each of the wells on each beam 50, 52, 54 and 56. Preferably, each strain gage is in the form of a series of resistor strips mounted on a thin foil fixed on an insulator backing. A typical strain gage has two resistor strips arranged in a herringbone pattern ninety degrees from each other, as shown in FIG. 9. The strain gages are placed in the wells such that the resistor strips in each strain gage extend substantially forty-five degrees with respect to the longitudinal axis extending through the bottom wall of each well.

As the crossleg 70 of each beam 50, 52, 54 and 56 includes two wells, each having one strain gage mounted therein, the magnitude of strain sensitivities of the strain gages in each beam are adjusted such that when the strain sensitivities are added together, as described hereafter, the bridge output for unit force will be independent of load path from the rim to the hub. Thus, the strain gages mounted in the wells 90 and 92 of the beam 50 will have ½ the relative strain sensitivity as a similar strain gage mounted in the well 80 in the stem 68 of the beam 50. This enables the connection of six strain gages symmetrically in four arms of a bridge circuit to achieve sensitivity that is independent of a load path from the rim to the hub.

The strain gages are mounted in each of the wells on the beams 50, 52, 54 and 56 in a particular orientation to measure certain directional forces applied to the transducer 10. Thus, the strain gages mounted in the wells in the stem 68 of each beam 50, 52, 54 and 56 will be oriented generally lengthwise on the longitudinal axis of each well 80i, 80o, 94i, 94o, 100i, 100o, 106i, and 106o. Two strain gages are mounted in each well 80i, 80o, 94i, 94o, 100i, 100o, 106i and 106o in each stem 68 of each beam 50, 52, 54 and 56, one for measuring force and one for measuring torque moment. The second strain gage in each of these wells is denoted by reference numbers 81, 95, 101 and 107, respectively. The strain gages mounted in the wells in the crossleg 70 of each beam 50, 52, 54 and 56 extend longitudinally along the length of each well.

In addition, each strain gage will be oriented to be placed in either tension or compression depending upon its mounting location and the desired force or moment to be measured. Each strain gage shown in the following bridge wiring diagrams will carry a further designation of "c" for compression and "t" for tension.

Figure 10:
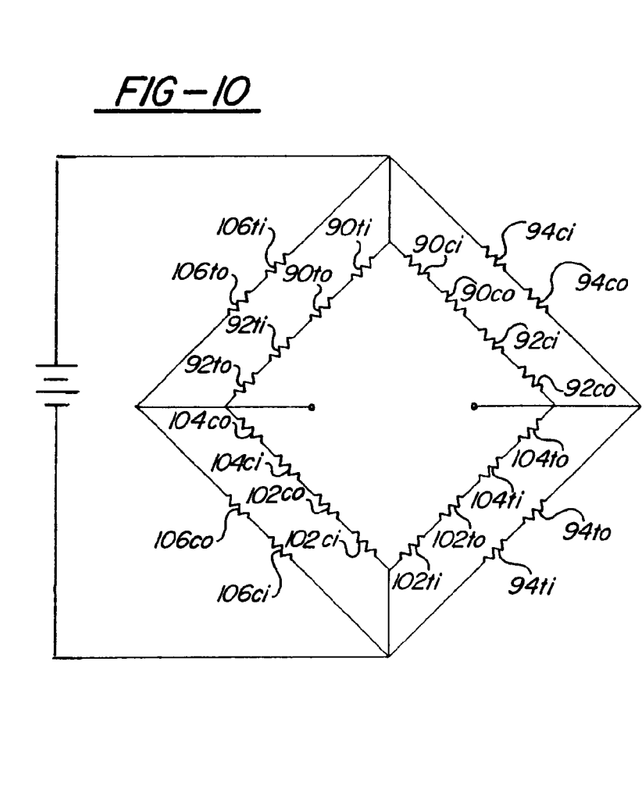
FIGS. 10–15 are strain gage bridge wiring diagrams for generating different force and moment magnitudes.
Figure 12:
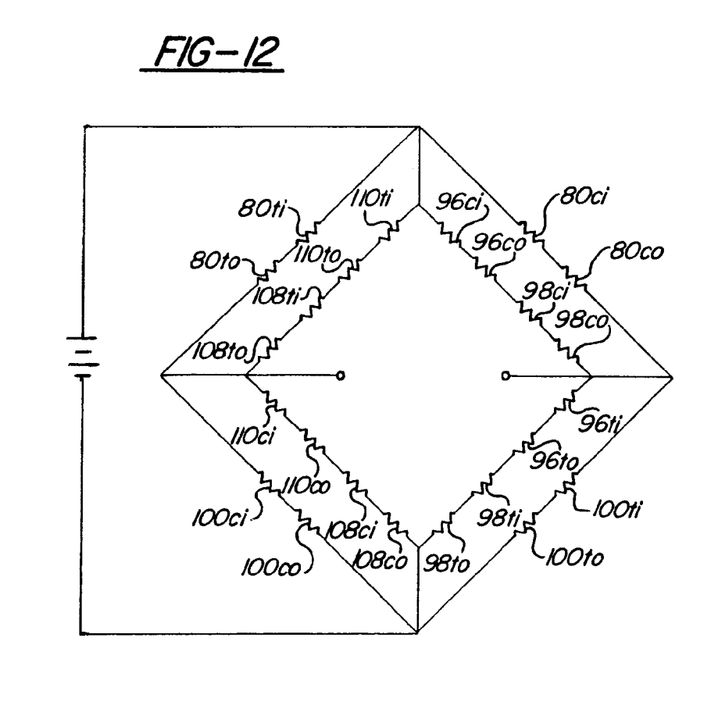

In measuring the vertical force applied to a wheel, only selected strain gages come into play. The vertical force which is assumed to be centered at the bottom, center of the wheel will be measured by summing the strains measured by the strain gages in the wells 90ci, 90co, 92ci, 92co, 104ti, 104to, 102ti, 102to, 102ci, 102co, 104ci, 104co, 92to, 92ti, 90to, 90ti, 94ci, 94co, 94to, 94ti, 106ci, 106co, 106ti and 106to, as shown in FIG. 10. The strain gages in the other wells on the beams 50, 52, 54 and 56 do not provide any significant output in the vertical direction; but do provide a strain force measurement for any longitudinal component of the external force. The longitudinal force component is obtained by combining the outputs of the strain gages mounted in the wells 80to, 80ti, 80ci, 80co, 100ti, 100to, 100co, 100ci, 96ci, 96co, 98ci, 98co, 96ti, 96to, 98ti, 98to, 108co, 108ci, 110co, 10ci, 108to, 108ti, 110to, and 110ti as shown in FIG. 12.

Figure 11:
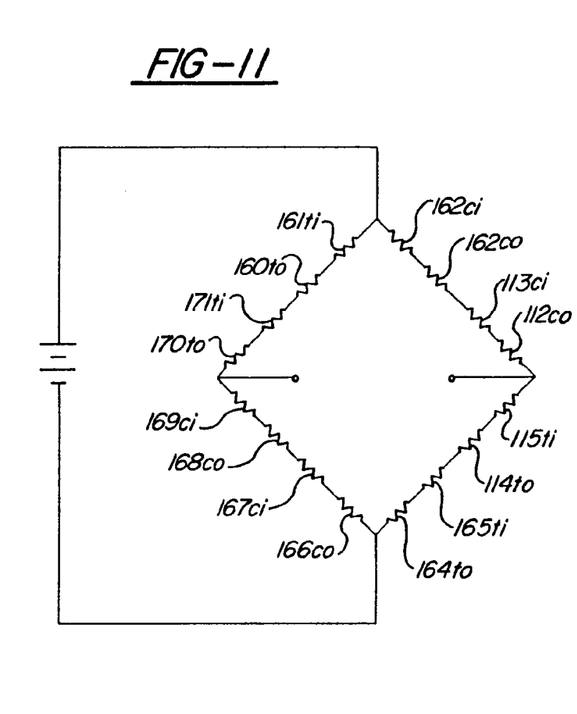

Lateral forces exerted on the wheel can be measured by the transducer 10 by placing strain gages on the exterior surface of both sidewalls 76 and 78 of the stem 68 of each beam 50, 52, 54 and 56 as shown in FIG. 9. Two strain gages, each formed of a pair of angularly disposed resistor strips, are mounted on the exterior surface of each sidewall 76 and 78. Each strain gage on each sidewall 76 and 78 is, however, separately connected as shown in FIG. 11. Thus, the outputs of certain of the strain gages 112, 113, 114, 115, 160, 161, 162, 163, 164, 165, 166, 167, 168, 169, 170, and 171 located adjacent to the inner and outer surfaces of each stem 68 are summed by a four arm bridge circuit shown in FIG. 11 or by suitable data processing means as is conventional to provide a measurement of lateral force exerted on the wheel.

Figure 13:
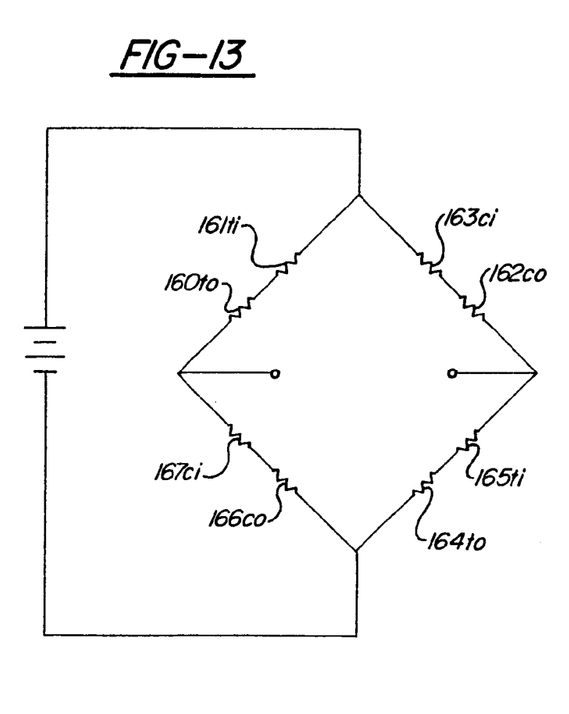
Figure 14:
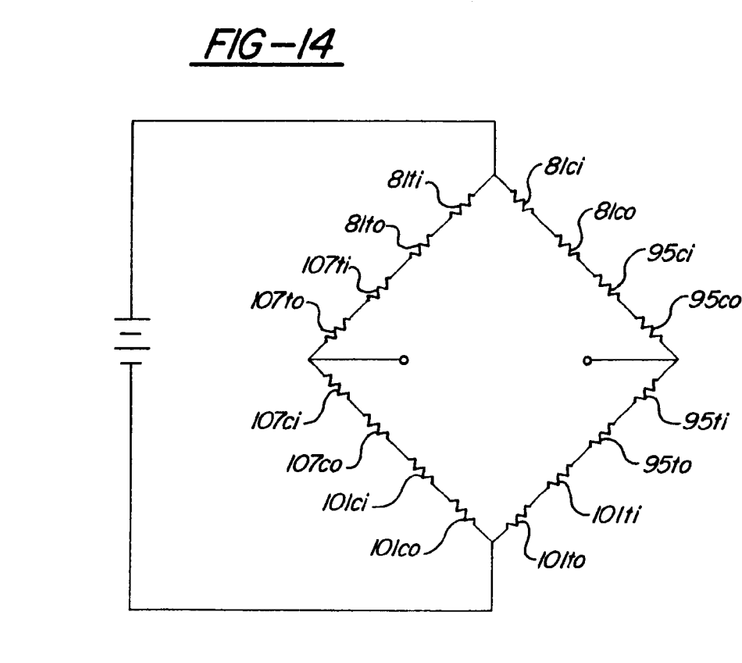
Figure 15:
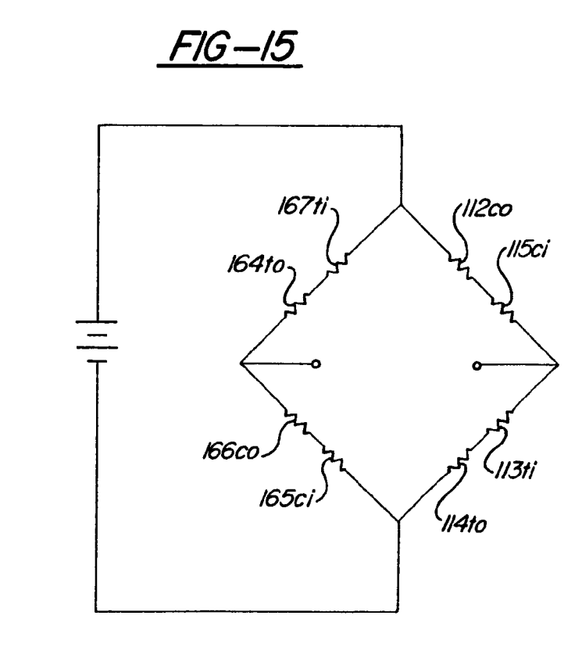

Suitable connections of the strain gages on the sidewalls 76 and 78 of the stem 68 of each beam 50, 52, 54 and 56, and in each stem 68, as shown in FIGS. 13–15, provides separate moment measurements for camber, torque and steering moment, respectively, exerted on the wheel during rotation of the wheel.

Various wire routing bores or channels are formed in the beams 50, 52, 54 and 56 to provide routing of the wires from the strain gages mounted in the wells on each beam 50, 52, 54 and 56 to a central location for output to a remote data acquisition unit. As shown in FIG. 1, separate wire bores 116, 118 and 120 extend respectively from each of the wells 80o, 90o and 92o on the beam 50. Each of the bores 116, 118 and 120 open to the first notch 72 formed adjacent the top surface of the crossleg 70 of the beam 50. As shown in FIG. 3, a first bottom wire bore 122 projects from the notch 72 inward to the bottom well 80i. An opposed bottom wire bore 124 projects from an opposite side of the bottom well 80i to a wire guide 126 in the form of an annular groove extending along an outer edge of the inner ring 30. Wires from the strain gages on each of the beams 50, 52, 54 and 56 are routed in a similar manner through the same arrangement of bores in each beam to the central, annular wire guide 126. The wires in the wire guide 126 may be sealed by means of a suitable potting compound.

Figure 8:
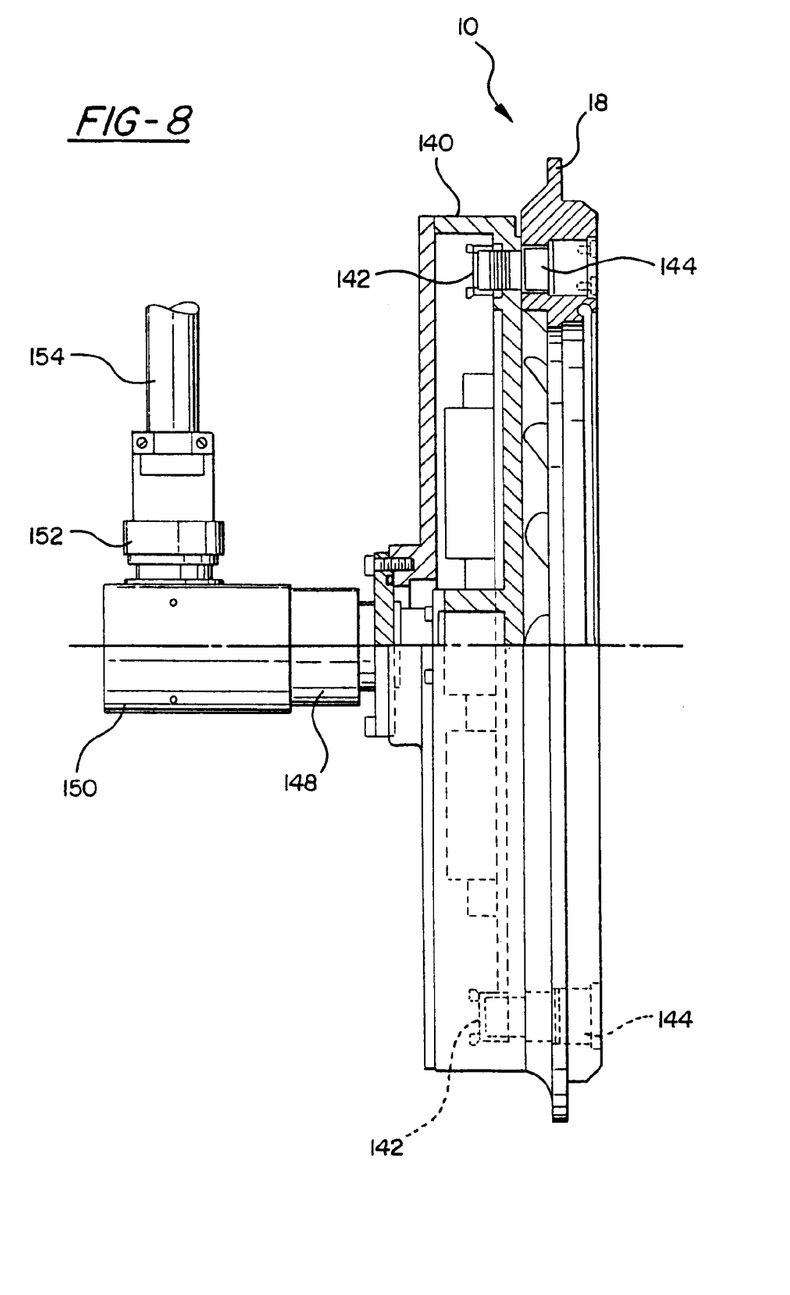
FIG. 8 is a partially cross sectioned, side elevational view of the amplifier and slip ring assembly shown in FIG. 7.

The outer ends of each of the wires extend to a connection in a pin connector 144, shown in FIG. 8, mounted in at least one or two connector mounting flanges 128 and 130 disposed diametrically apart and integrally formed as part of the inner ring 30. As shown in FIG. 1, the outer surfaces of the flange 128 has a centrally located well or bore 132 sized to receive the shell of the conventional pin connector 144. Mounting apertures are formed in the flanges for securing the flanges on the connector shell to the flange 128 or 130.

Figure 7:
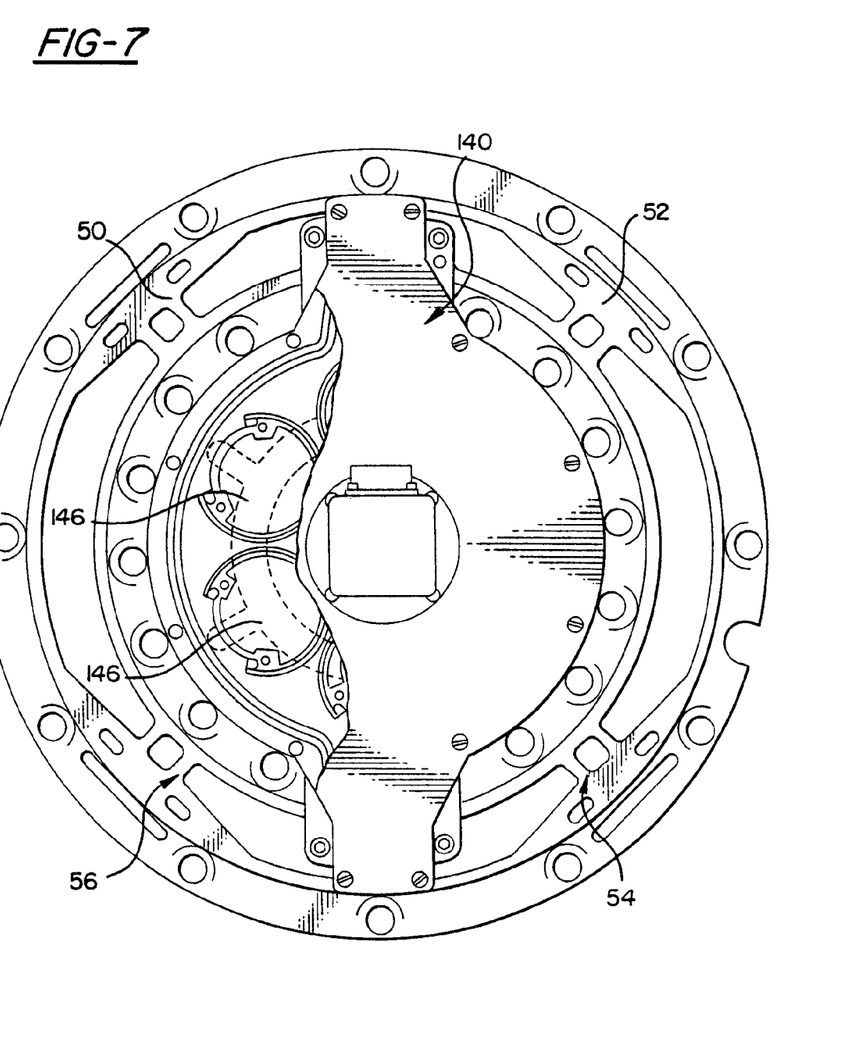
FIG. 7 is a partially cross section, frontal elevational view of an amplifier and slip ring assembly mountable on the wheel load transducer shown in FIG. 1.

The mounting flanges 128 and 130 also provide for the attachment of an amplifier and slip ring assembly to the transducer 10. As shown in FIGS. 7 and 8, a housing 140 includes a pair of pin connectors 142 are diametrically mounted on the bottom wall of the housing 140 and engagable with the pin connectors 144 mounted in wells on the connector mounting flanges 128 and 130.

A plurality of amplifier assemblies 146 are mounted on a printed circuit board in the housing 140 for amplifying the output signals of individual bridges formed of the outputs of the various strain gages on the beams 50, 52, 54 and 56 of transducer 10, as described herein. Further details concerning the construction and function of the amplifiers 146 can be had by referring to U.S. Pat. No. 5,231,374, the contents of which are incorporated herein by reference.

As described therein, the outputs from the various amplifiers 146 are connected to a rotatable slip ring 148 coupled to a fixed housing 150. Output wires from the housing 150 extend to a connector 152 to a tubular member or conduit 154 which is mounted in a fixed position on the vehicle for carrying the conductors to a data acquisition unit mounted on the vehicle. The tubular member 154 holds the housing 150 in a fixed position relative to the rotating slip ring 148.

The multi-axis wheel load transducer of the present invention includes an outer ring fixably mountable on a rim adapter fixed on a wheel rim. An inner ring carries means for attaching a hub adapter to the inner ring for mounting the transducer on a vehicle wheel hub.

A plurality of T-shaped beams or sensing elements are integrally connected between the inner and outer rings and lie in the plane of the wheel or rim. A plurality of inward extending wells are formed in the outboard and inboard surfaces of each beam, each well receiving at least one strain gage in close proximity to the neutral axis of each beam for measuring forces and/or moments exerted on the wheel.

Preferably, four beams are provided between the inner and outer rings, circumferentially spaced ninety degrees apart. Each beam includes a stem extending substantially perpendicular to a crossleg. The stem integrally extends from the inner ring. The crossleg of each T-shaped beam is integrally joined to the outer rim.

Preferably, the wells are formed on each inboard and outboard surface of each beam and include at least one pair of wells in the stem along the longitudinal axis of the stem and at least two pairs of wells in the crossleg, each equidistantly spaced from the stem.

Each pair of wells extends from an inboard or outboard exterior surface of each beam to a bottom wall formed on a thin strip or web extending along the neutral or center longitudinal axis of the stem and crossleg of each beam. The strain gages are mounted on the bottom walls of each well and oriented in pre-determined directions to measure shear forces generated by vertical and longitudinal forces and/or torque exerted on the wheel. Additional strain gages are mounted on the exterior sidewalls of the stem and oriented to measure lateral forces and steering and camber moments.

Wire bores interconnect the wells in each beam to each other and to an annular wire groove formed in an outer peripheral edge of the inner ring for guiding the wires from each strain gage to a central location on the transducer. Selected strain gages are summed in a four arm bridge circuit or mathematically in a data acquisition unit to provide the desired force and/or torque measurements.

The wheel load transducer of the present invention has several unique features:

1. The sensing or beam elements have a unique T-shape,
2. Strain gages are located in wells on the sensing elements to minimize undesirable bending strains and to maximize desirable shear strains,
3. The sensing elements are provide with equal sensitivity to radial and tangential forces at each location. This results in a constant sensitivity to radial forces as the wheel load transducer rotates, and
4. Use of strain gages having a 2:1 resistance ratio enables the placement of six sensing locations with strain gages symmetrically into the four arms of a bridge circuit to achieve sensitivity that is independent of a load path from the rim to the hub.

The wheel load transducer of the present invention which has the above-listed features, significantly minimizes crosstalk between the various sensors so as to provide more accurate force and/or moment measurements. Measurement accuracy is further increased by uniquely mounting each sensor on the neutral axis of each web. Further, although a large number of individual sensors or strain gages are mounted on the transducer of the present invention, the individual sensors or strain gages are connected in various four arm bridge configurations so as to provide a minimal number of separate output data channels, such as six channels to measure three different forces and three different moments.

What is claimed is:

1. A load transducer mountable on a rotatable wheel, the transducer comprising:

an inner ring member;
means for attaching the inner ring member to a wheel hub;
an outer ring member;
means for attaching the outer ring member to a wheel rim;
a beam connected between the inner and outer ring members, the beam including:
   a stem extending from the inner ring member; and
   a crossleg unitarily formed with the stem and connected to the outer ring member;
   a well formed in each of the stem and the crossleg of the beam, each well having an inner bottom wall disposed in close proximity with a neutral axis of the beam; and
   a sensor mounted on the inner bottom wall of each well of the beam for measuring shear forces exerted perpendicular to the beam;
   the sensor on the stem oriented for measuring shear forces perpendicular to a longitudinal axis of the stem; and
   the crossleg being perpendicular to the stem such that the sensor on the crossleg is oriented for measuring shear forces perpendicular to a longitudinal axis of the crossleg.

2. The transducer of claim 1 wherein the beam comprises a plurality of spaced beams.

3. The transducer of claim 2 wherein the plurality of beams comprises four beams.

4. The transducer of claim 3 wherein the four beams are circumferentially spaced ninety degrees apart.

5. The transducer of claim 2 wherein each beam is spaced by apertures from adjacent beams.

6. The transducer of claim 1 wherein oppositely extending sidewalls are formed on the stem.

7. The transducer of claim 1 further comprising:

means for isolating a portion of the crossleg from the outer ring member.

8. The transducer of claim 7 wherein the isolating means comprises:

a notch on one side of the crossleg between the crossleg and the outer ring member.

9. The transducer of claim 1 wherein the stem and the crossleg have first and second opposed surfaces, including a plurality of wells, at least one well formed on the first surface of each of the stem and the crossleg.

10. The transducer of claim 9 further comprising:

an additional well formed on the second surfaces of the stem and the crossleg and aligned with the well on the first surfaces of the stem and the crossleg, respectively.

11. The transducer of claim 10 wherein each additional well extends into the beam to a bottom wall, the bottom wall disposed in proximity with the neutral axis of the beam.

12. The transducer of claim 9 wherein the well in each crossleg comprises:

at least one first well formed on the first surface of a crossleg.

13. The transducer of claim 12 further comprising:

a second well formed on the first surface of the crossleg and spaced from the first well.

14. The transducer of claim 13 wherein the first and second wells on the crossleg are spaced equi-distantly about a longitudinal axis of the stem.

15. The transducer of claim 12 further comprising:

a third well formed on the second surface of the crossleg and aligned with the first well on the first surface of the crossleg.

16. The transducer of claim 15 further comprising:

a fourth well formed on the second surface of the crossleg and aligned with the second well on the first surface of the crossleg.

17. The transducer of claim 1 wherein the wells further comprise:

one well formed in the stem along a longitudinal axis of the stem; and a pair of wells formed in the crossleg, perpendicular to and equi-distantly spaced about the longitudinal axis of the stem; and the sensor including at least one strain gage mounted in the stem, the crossleg and on the exterior surface of the side wall of the stem.

18. The transducer of claim 17 wherein:

the strain gage mounted on the exterior surface of the sidewall of the stem is disposed between the inner ring member and the crossleg.

19. The transducer of claim 18 further comprising:

selected ones of the strain gages in the stem, the crosslegs and on the exterior surface of the side wall of the stem being interconnected to form a four arm bridge.

20. The transducer of claim 19 wherein a sensitivity of each strain gage in the wells in the crossleg of each beam is equal.

21. The transducer of claim 20 wherein the sensitivity of each strain gage in the wells on the crossleg is one half of the sensitivity of the strain gage in the wells on the stem.

22. The transducer of claim 19 wherein the well extends along the neutral axis of the beam.

23. The transducer of claim 19 wherein the strain gage comprises a pair of linear arranged resistor strips.

24. The transducer of claim 23 wherein the strain gage comprises a pair of resistor strips angularly arranged with respect to each other.

25. The transducer of claim 1 further comprising:

the sensor being a strain gage having electrical conductors extending therefrom;

an electrical connector mounted between the inner and outer ring members;

at least one bore extending through the beam and opening exteriorly off the beam to provide passage for the electrical conductors from the strain gage to the electrical connector.

26. The transducer of claim 25 further comprising:

a recess formed along the outer ring member for carrying the electrical conductors from the beam to the electrical connector.

27. The transducer of claim 1 wherein the sensor is a strain gage, the strain gage comprising:

a pair of linear arrange resistor strips.

28. The transducer of claim 27 wherein:

the pair of resistor strips are angularly arranged with respect to each other.

* * * * *